(12) United States Patent
Ilan et al.

(10) Patent No.: US 12,375,372 B2
(45) Date of Patent: *Jul. 29, 2025

(54) ZERO-COPY FORWARDING FOR NETWORK FUNCTION VIRTUALIZATION

(71) Applicant: Red Hat, Inc., Raleigh, NC (US)

(72) Inventors: Amnon Ilan, Raanana (IL); Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 645 days.

This patent is subject to a terminal disclaimer.

(21) Appl. No.: 17/842,626

(22) Filed: Jun. 16, 2022

(65) Prior Publication Data

US 2022/0321433 A1 Oct. 6, 2022

Related U.S. Application Data

(63) Continuation-in-part of application No. 16/686,362, filed on Nov. 18, 2019, now Pat. No. 11,394,786.

(51) Int. Cl.
*H04L 43/028* (2022.01)
*H04L 9/40* (2022.01)
*H04L 43/04* (2022.01)

(52) U.S. Cl.
CPC ............ *H04L 43/028* (2013.01); *H04L 43/04* (2013.01); *H04L 63/0236* (2013.01); *H04L 63/0263* (2013.01); *H04L 63/0281* (2013.01)

(58) Field of Classification Search
USPC ....... 370/229, 230, 235, 236, 237, 241, 252, 370/351, 352, 359, 389, 392, 401
See application file for complete search history.

(56) References Cited

U.S. PATENT DOCUMENTS

| | | |
|---|---|---|
| 6,801,927 B1 | 10/2004 | Smith et al. |
| 7,792,021 B1 | 9/2010 | Pankajakshan |
| 8,893,113 B1 | 11/2014 | Nguyen |
| 9,043,811 B2 | 5/2015 | Radhakrishnan et al. |
| 10,230,608 B2 | 3/2019 | Tsirkin |
| 10,248,447 B2 | 4/2019 | Leitner |
| 10,331,468 B2 | 6/2019 | Gray |
| 10,397,044 B2 | 8/2019 | Chu et al. |

(Continued)

OTHER PUBLICATIONS

Sun, Chen et al, Tsinghua University; Clemson University, "NFP: Enabling Network Function Parallelism in NFV", hittps://par.nsf.gov/servlets/purl/10073026, Aug. 21-25, 2017, 14 pages.

(Continued)

*Primary Examiner* — Nguyen H Ngo
(74) *Attorney, Agent, or Firm* — Dority & Manning, P.A.

(57) ABSTRACT

Systems and methods for zero-copy forwarding for network function virtualization (NFV). An example method comprises: receiving, by a supervisor of a host computer system, a definition of a packet filter originated by a virtual execution environment running on the host computer system; responsive to validating the packet filter, associating the packet filter with a vNIC of the virtual execution environment; receiving, by the supervisor, a network packet originated by the vNIC; and responsive to matching the network packet to a network connection specified by the packet filter, causing the packet filter to forward the network packet via the network connection.

18 Claims, 6 Drawing Sheets

(56) References Cited

U.S. PATENT DOCUMENTS

| | | | |
|---|---|---|---|
| 2007/0204337 | A1 | 8/2007 | Schnackenberg et al. |
| 2010/0280999 | A1 | 11/2010 | Atluri et al. |
| 2013/0111474 | A1* | 5/2013 | Agarwal ............ G06F 12/0842 718/1 |
| 2017/0126797 | A1 | 5/2017 | Frid |
| 2018/0063000 | A1* | 3/2018 | Wu ......................... H04L 45/74 |
| 2018/0239715 | A1 | 8/2018 | Tsirkin et al. |
| 2020/0053050 | A1* | 2/2020 | Malysh ............... H04L 63/0254 |
| 2020/0092790 | A1* | 3/2020 | Salkintzis ............. H04W 76/10 |
| 2020/0319907 | A1 | 10/2020 | Jain |
| 2021/0029083 | A1 | 1/2021 | Li et al. |

OTHER PUBLICATIONS

Kawashima, Ryota, Matsuo, Hiroshi, Department of Computer Science and Engineering Nagoya Institute of Technology; Japan, "OVTee: A Fast and Pragmatic Software-based Zero-copy/Pass-through Mechanism for NFV-nodes", https://www.researchgate.net/publication/332371064_IOVTee_A_Fast_and_Pragmatic_Software-based_Zero-copyPass-through_Mechanism_for_NFV-nodes, Apr. 2019, 7 pages.

USPTO, Office Action for U.S. Appl. No. 16/686,362, mailed Aug. 4, 2021.

USPTO, Final Office Action for U.S. Appl. No. 16/686,362, mailed Nov. 26, 2021.

USPTO, Advisory Action for U.S. Appl. No. 16/686,362, mailed Feb. 4, 2022.

UPTO, Notice of Allowance for U.S. Appl. No. 16/686,362, mailed Mar. 8, 2022.

* cited by examiner

ZERO-COPY FORWARDING FOR NETWORK FUNCTION VIRTUALIZATION

RELATED APPLICATIONS

The present application is a continuation-in-part of application Ser. No. 16/686,362, filed Nov. 18, 2019, entitled "Zero-Copy Forwarding for Network Function Virtualization," which is incorporated by reference herein.

TECHNICAL FIELD

The present disclosure is generally related to virtualized computer systems, and is more specifically related to zero-copy forwarding for network function virtualization (NFV).

BACKGROUND

Network interface controllers (NIC) implement the OSI layer 1 (physical layer) and OSI layer 2 (data link layer standards), thus providing physical access to a networking medium and a low-level addressing system using media access control (MAC) addresses, in order to allow computer systems to communicate over a wired or wireless network.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
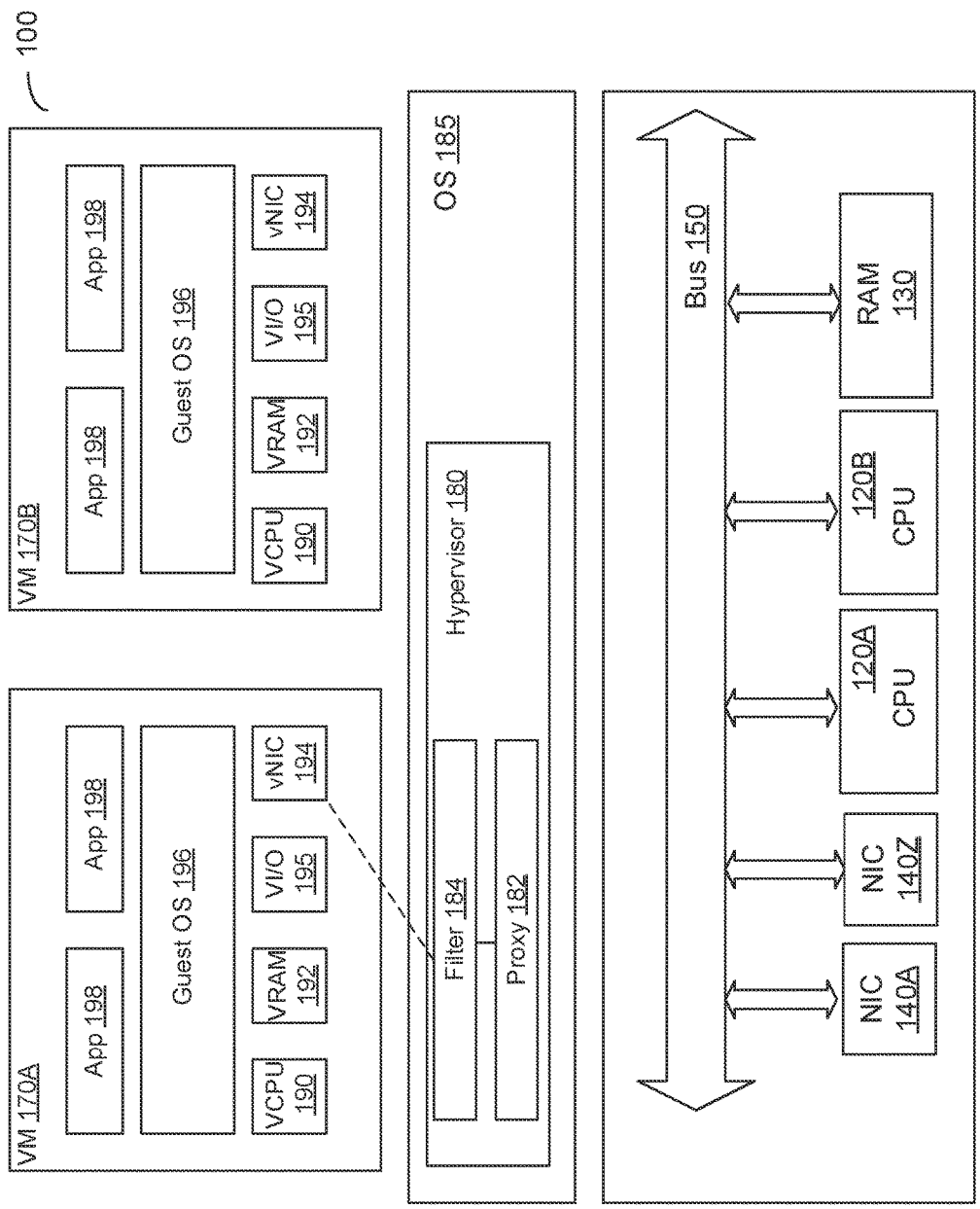
FIG. 1 depicts a high-level component diagram of an example host computer system operating in accordance with one or more aspects of the present disclosure.

Described herein are methods and systems for zero-copy forwarding for network function virtualization (NFV). A host computer system may be equipped with one or more network interface controllers (NICs) providing physical access to a networking medium and a low level addressing system (e.g., using media access control (MAC) addresses), in order to allow the host computer system to communicate over a wired or wireless network. Each of one or more virtual execution environments running on the host computer system may have one or more virtual network interface controllers (vNICs). In various illustrative examples, a virtual execution environment may be represented by a virtual machine running on the host computer system, a containerized application running on the host computer system, a privileged process running on the host computer system, or an unprivileged process running on the host computer system. Each virtual machine running on the host computer system may provide a fully isolated execution environment. Conversely, two or more containers running on the host computer system may share the kernel, while providing otherwise isolated execution environments.

A virtual execution environment may be managed by a privileged component (e.g., the operating system kernel managing one or more processes running on the host computer system, a privileged process in the operating system managing one or more processes running on the host computer system, a hypervisor running one or more virtual machines running on the host computer system, or a supervisor managing one or more containerized application running on the host computer system), which is referred to as "supervisor" herein.

In some implementations, the data transmitted by and addressed to one or more vNICs may be handled by a supervisor-managed proxy application, which may run within a privileged or non-privileged context on the host computer system, within a virtual execution environment running on the host computer system, or on another host computer system. In an illustrative example, in order to support a Transmission Control Protocol (TCP) connection initiated by a vNIC, the proxy application would create a pair of sockets, including one socket for communicating with the vNIC driver and another socket for communicating with the destination. Responsive to receiving data on one of the sockets, the proxy applications would forward it to another socket of the pair of sockets. When one of the sockets is eventually closed, the proxy applications would close the remaining socket of the pair of sockets. However, the above-described data forwarding scheme involves creating multiple data copies on all stages of the communication process, and is prone to losing packet boundaries, retransmission/bandwidth information, etc.

Implementations of the present disclosure alleviates the above-noted and other deficiencies by providing methods and systems for implementing zero-copy forwarding for network function virtualization (NFV). In an illustrative example, each virtual execution environment running on a host computer system may create, for one or more network connections associated with each vNIC of the virtual execution environment, a packet filter (such as a Berkeley Packet Filter (BPF)) for matching network packets, based on their link layer protocol fields, to the respective network connections. The virtual execution environment may forward the packet filter definition to the supervisor. Responsive to validating the packet filter definition, the supervisor may associate the packet filter with the vNIC, and may run the packet filtering program within the supervisor context.

For a network packet initiated by the vNIC, the packet filter may compare one or more data link layer fields of the network packet (e.g., the protocol, the port, and the destination IP address) with the corresponding data link layer parameters of existing network connections maintained by the proxy application on behalf of the vNIC. Should a matching connection be identified, the packet filter would forward the network packet directly to that connection, bypassing the proxy application. Forwarding the network packet to the identified connection may involve modifying certain fields of the network packet (e.g., the source Internet Protocol (IP) address). An incoming packet received on the connection may be similarly modified (e.g., by modifying the destination IP address), and may be forwarded to the vNIC, again bypassing the proxy application.

Conversely, should no existing connection be found that would match the destination address of an outgoing network packet, the supervisor would notify the proxy application thus causing it to create a new connection to the specified destination and modify the filter accordingly. Notably, since every vNIC of the host computer system may have a corresponding packet filter associated with it, the above-described packet filtering scheme may be implemented in a multi-tenant environment.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 depicts a high-level component diagram of an example host computer system operating in accordance with one or more aspects of the present disclosure. The example computer system 100 may comprise one or more processors 120A-120B communicatively coupled to one or more memory devices 130 and two or more NICs 140A-140B via a system bus 150.

"Processor" or "processing device" herein refers to a device capable of executing instructions encoding arithmetic, logical, or I/O operations. In one illustrative example, a processor may follow the von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In various implementations, computer system 100 may further comprise various other devices, such as peripheral device controllers, which are omitted from FIG. 1 for clarity and conciseness.

The example computer system 100 may be employed as a host system configured to run multiple virtual execution environments 170, by executing a software layer 180, referred to as "supervisor," above the hardware and below the virtual execution environments. In one illustrative example, the supervisor 180 may be a component of an operating system 185 executed by host computer system 100. Alternatively, the supervisor 180 may be provided by an application running under the host operating system 185, or may run directly on host computer system 100 without an operating system beneath it. The supervisor 180 may abstract the physical layer, including processors, memory, and I/O devices, and present this abstraction to virtual execution environments 170 as virtual devices.

A virtual execution environment 170 may comprise one or more virtual processors (vCPUs) 190. Processor virtualization may be implemented by the supervisor 180 scheduling time slots on one or more physical processors (CPUs) 120 such that, from the guest operating system's perspective, those time slots are scheduled on a virtual processor 190. The virtual execution environment 170 may execute a guest operating system 196, which may utilize the underlying virtual devices, including the virtual memory 192, virtual I/O devices 195, and vNICs 194. One or more applications 198 may be running on virtual execution environment 170 under the guest operating system 196.

As noted herein above, the data transmitted by and addressed to vNICs 194 may be handled by a supervisor-managed proxy application 182. In the example implementation of FIG. 1, the proxy application 182 runs within the context of the supervisor 180. In another example, the proxy application may run within an unprivileged context of the host computer system 100, e.g., in a virtual execution environment running on the host computer system 100 or a standalone application running under the host OS 185. In a yet another example, the proxy application may run on another host computer system.

For each vNIC 194, the respective virtual execution environment 170 may create an associated packet filter 184 for matching the network packets transmitted by and/or addressed to the vNIC to active connections maintained by the proxy application 182, as described in more detail herein below with reference to FIG. 2.

Figure 2:
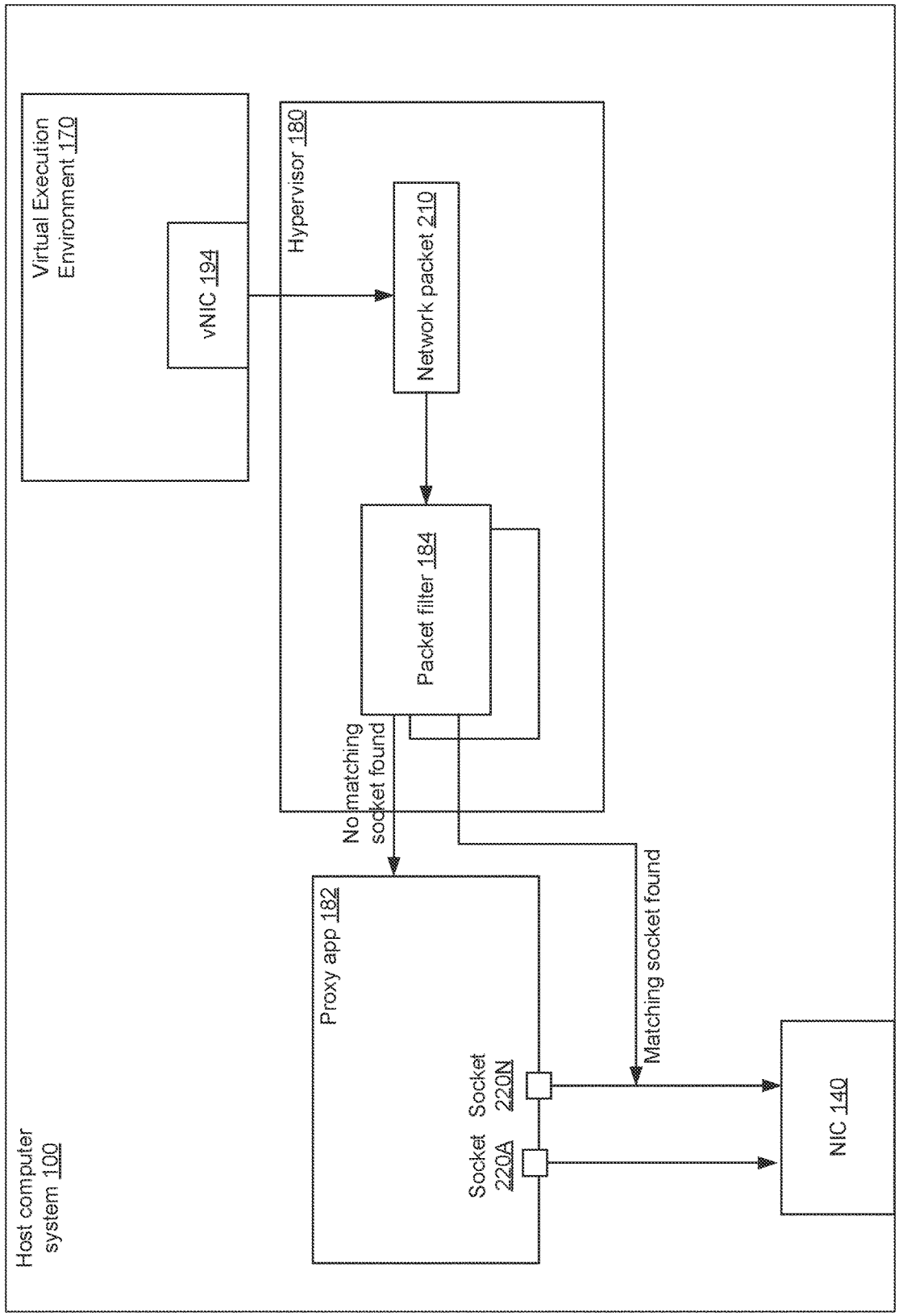
FIG. 2 schematically illustrates an example zero-copy forwarding for NFV implemented by a host computer system operating in accordance with one or more aspects of the present disclosure.

FIG. 2 schematically illustrates an example zero-copy forwarding for NFV implemented by a host computer system operating in accordance with one or more aspects of the present disclosure. As shown in FIG. 2, a proxy application 182 may run in the context of the supervisor 180 or in an unprivileged context of the host computer system 100, e.g., in a virtual execution environment running on the host computer system 100, in a standalone application running under the host OS, or on another host computer system. For one or more network connections associated with each vNIC 194, the respective virtual execution environment 170 may create a packet filter for matching network packets, based on their link layer protocol fields, to existing network connections. Upon creating the packet filter 184, the virtual execution environment 170 may forward the packet filter definition to the supervisor 180.

In an illustrative example, the packet filter 184 may be implemented as a Berkeley Packet Filter (BPF), which is a pseudo-device that may be bound to a network interface, such that reading from the pseudo-device would return packets received on the network interface, while writing to the device would inject packets on the network interface. Accordingly, responsive to validating the packet filter 184, the supervisor 180 may associate the packet filter 184 with the vNIC 194, and may run the packet filtering program within the supervisor context. Validating the packet filter 184 may involve ensuring that the packet filtering rules encoded by the packet filter definition are not mutually-exclusive and do not specify an infinite loop or infinite recursion.

In operation, responsive to receiving a network packet 210 initiated by the vNIC 194, the supervisor 180 may identify the packet filter 184 associated with the vNIC 194 and apply the identified packet filter 184 to the network packet 210. The packet filter 184 may compare one or more data link layer fields of the network packet 210 with the corresponding data link layer parameters of existing network connections 220A-220N maintained by the proxy application 182 on behalf of the vNIC 194. In an illustrative example, the data link layer parameters may include the protocol (e.g., TCP or UDP), the port, and the destination IP address. Should a matching connection 220N be identified, the packet filter 184 may forward the network packet 210 directly to the identified connection 220N, thus bypassing the proxy application 182.

Forwarding the outgoing network packet 210 to the identified connection 220N may involve modifying certain fields of the network packet (e.g., setting the source IP address of the network packet to the IP address of the host NIC 140 which is employed for sending and receiving packets on the identified connection 220N). An incoming network packet (not shown in FIG. 2) received on the connection 220N may be similarly modified by the packet filter 184 (e.g., by setting the destination IP address of the incoming network packet to the IP address assigned to the vNIC 194), and may be forwarded to the vNIC 194, again bypassing the proxy application 182.

Conversely, should applying the packet filter 184 to the outgoing network packet 210 yield no existing connection that would match the specified link layer parameters of the outgoing network packet 210, the supervisor 180 may notify the proxy application 182, thus causing it to create a new connection to the specified destination and modify the packet filter 184 accordingly.

Figure 3:
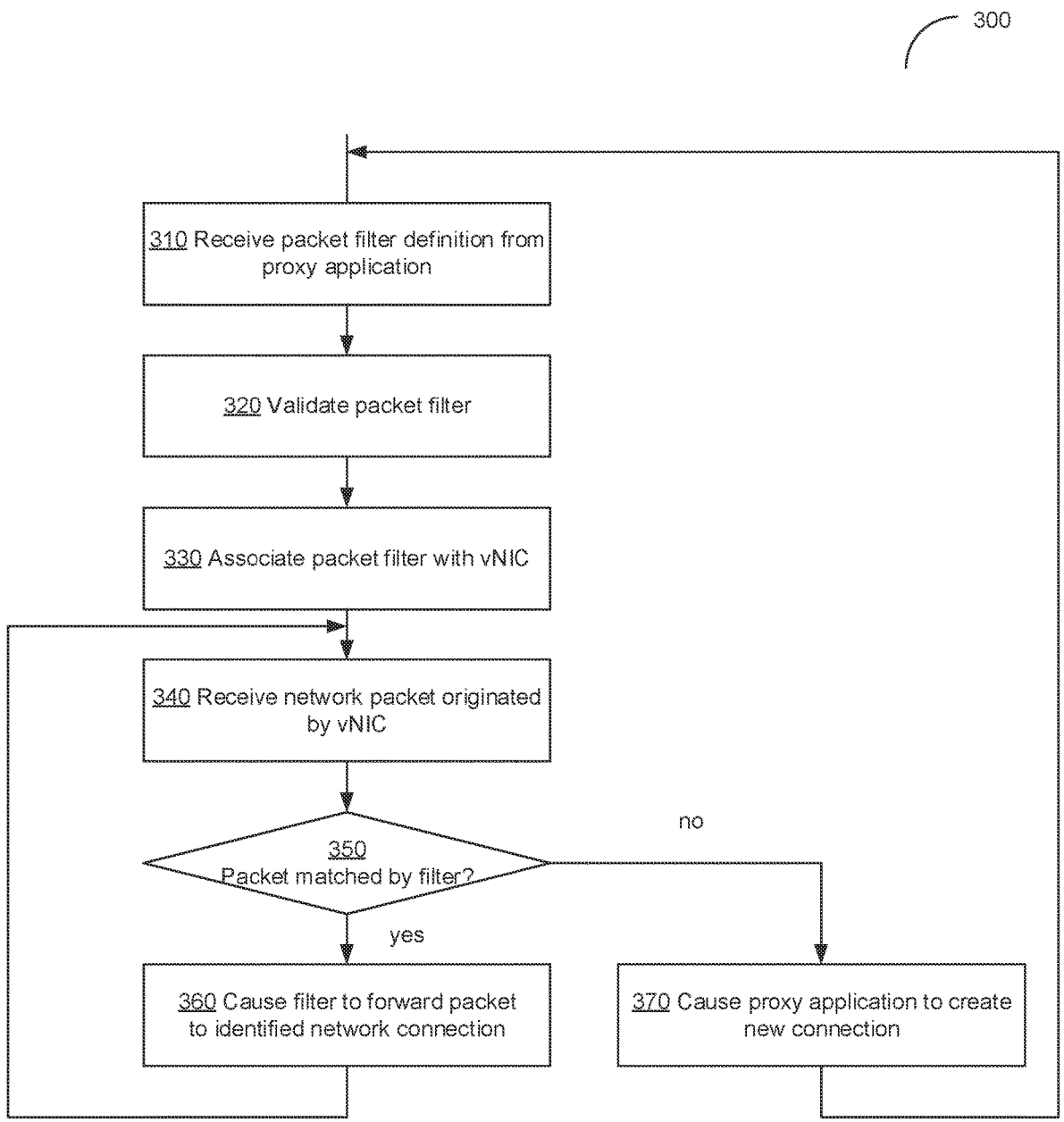
FIG. 3 depicts a flowchart of an example method of zero-copy forwarding for NFV, in accordance with one or more aspects of the present disclosure.

FIG. 3 depicts a flowchart of an example method 300 of zero-copy forwarding for NFV, in accordance with one or more aspects of the present disclosure. In some implementations, method 300 may be performed by a single processing thread executed by a processing device. Alternatively, method 300 may be performed by two or more processing threads executed by one or more processing devices, such that each thread would execute one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel and/or in arbitrary selected orders.

At block 310, the supervisor running on a host computer system implementing the method may receive, from a virtual execution environment running on the host computer system, a definition of a packet filter for matching network packets, based on their link layer protocol fields, to existing network connections. The link layer protocol fields may include the protocol (e.g., TCP or UDP), the port, and the destination IP address, as described in more detail herein above.

At block 320, the supervisor may validate the packet filter. Validating the packet filter may involve ensuring that the packet filtering rules encoded by the packet filter definition are not mutually-exclusive and do not specify an infinite loop or infinite recursion, as described in more detail herein above.

At block 330, the supervisor may associate the packet filter with a vNIC of the virtual execution environment that has produced the packet filter definition. Accordingly, reading from the pseudo-device implemented by the packet filter would return packets received on the network connection selected by the filter, while writing to the device would inject packets into the selected network connection.

The operations of blocks 310-330 may be repeated for associating packet filters with one or more vNICs of one or more virtual execution environments running on the host computer system implementing the method.

At block 340, the supervisor may receive a network packet originated by a vNIC of a virtual execution environment running on the host computer system.

Responsive to successfully matching, at block 350, the network packet to a network connection specified by the packet filter associated with the vNIC, the supervisor may, at block 360, cause the packet filter to forward the network packet via the identified network connection, and the method may loop back to block 340.

Alternatively, should the packet filter associated with the vNIC fail to match, at block 350, an existing network connection to the outgoing network packet, the supervisor may, at block 370, cause the network proxy application to create a new network connection to the destination specified by the network packet, and the method may loop back to block 310.

Figure 4:
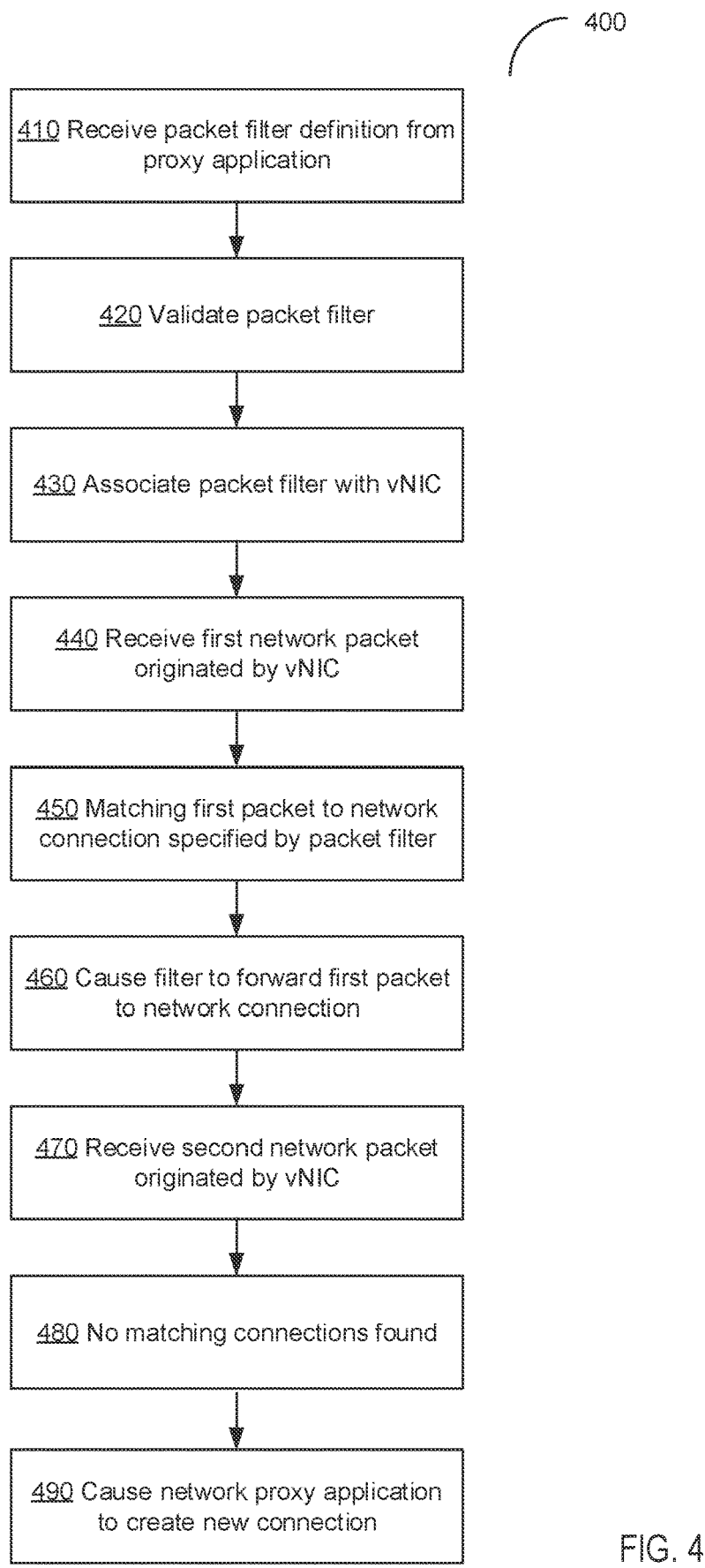
FIG. 4 depicts a flowchart of another example method of zero-copy forwarding for NFV, in accordance with one or more aspects of the present disclosure

FIG. 4 depicts a flowchart of an example method 400 of zero-copy forwarding for NFV, in accordance with one or more aspects of the present disclosure. In some implementations, method 400 may be performed by a single processing thread executed by a processing device. Alternatively, method 400 may be performed by two or more processing threads executed by one or more processing devices, such that each thread would execute one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, the supervisor running on a host computer system implementing the method may receive, from a virtual execution environment running on the host computer system, a definition of a packet filter for matching network packets, based on their link layer protocol fields, to existing network connections. The link layer protocol fields may include the protocol (e.g., TCP or UDP), the port, and the destination IP address, as described in more detail herein above.

At block 420, the supervisor may validate the packet filter. Validating the packet filter may involve ensuring that the packet filtering rules encoded by the packet filter definition are not mutually-exclusive and do not specify an infinite loop or infinite recursion, as described in more detail herein above.

At block 430, the supervisor may associate the packet filter with a vNIC of the virtual execution environment that has produced the packet filter definition. Accordingly, reading from the pseudo-device implemented by the packet filter would return packets received on the network connection selected by the filter, while writing to the device would inject packets into the selected network connection.

At block 440, the supervisor may receive a first network packet originated by a vNIC of a virtual execution environment running on the host computer system.

At block 450, the supervisor may identify, by applying the packet filter associated with the vNIC, a network connection matching the data link layer fields (e.g., the protocol, the port, and the destination address) of the first network packet, as described in more detail herein above.

At block 460, the supervisor may cause the packet filter to forward the first network packet via the identified network connection, as described in more detail herein above.

At block 470, the supervisor may receive a second network packet originated by the vNIC.

Responsive to failing to match, at block 480, an existing network connection to the second network packet, the supervisor may, at block 490, cause the network proxy application to create a new network connection to the destination specified by the second network packet.

Figure 5:
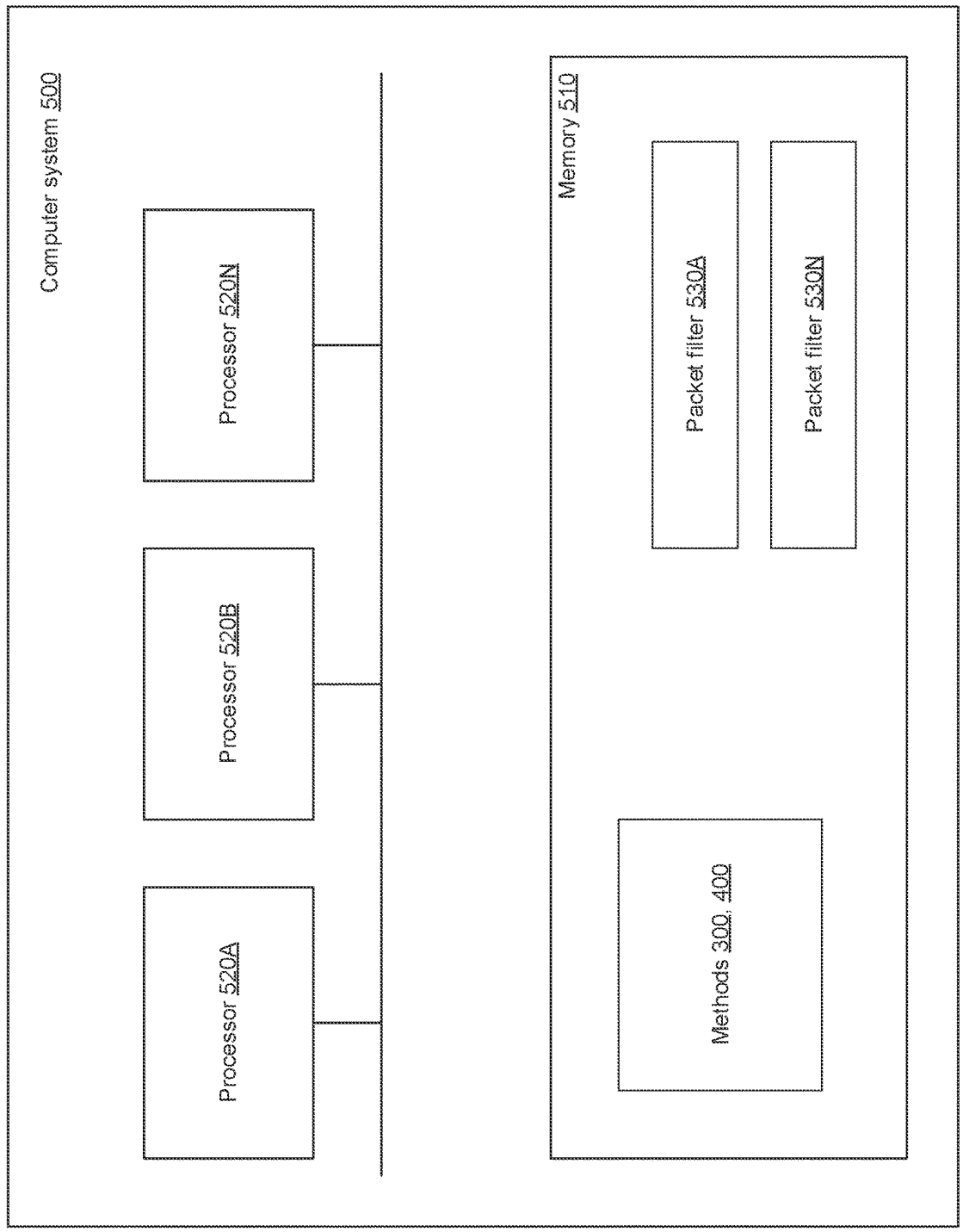
FIG. 5 depicts a high-level component diagram of an example computer system, which may be employed to implement the systems and methods described herein.

FIG. 5 depicts a block diagram of an illustrative computer system 500 operating in accordance with one or more aspects of the disclosure. In various implementations, computer system 1000 may perform the functions of to the host computer system 100 of FIG. 1. Computer system 500 comprises a memory 510 and one or more physical processors 520A-520N, that are operatively coupled to the memory 510 and execute the code implementing the methods 300 and/or 400 for zero-copy forwarding for NFV. The memory 510 may further store definitions of packet filters 530A-530N associated with respective vNICs of one or more virtual execution environments running on the host computer system 500.

Figure 6:
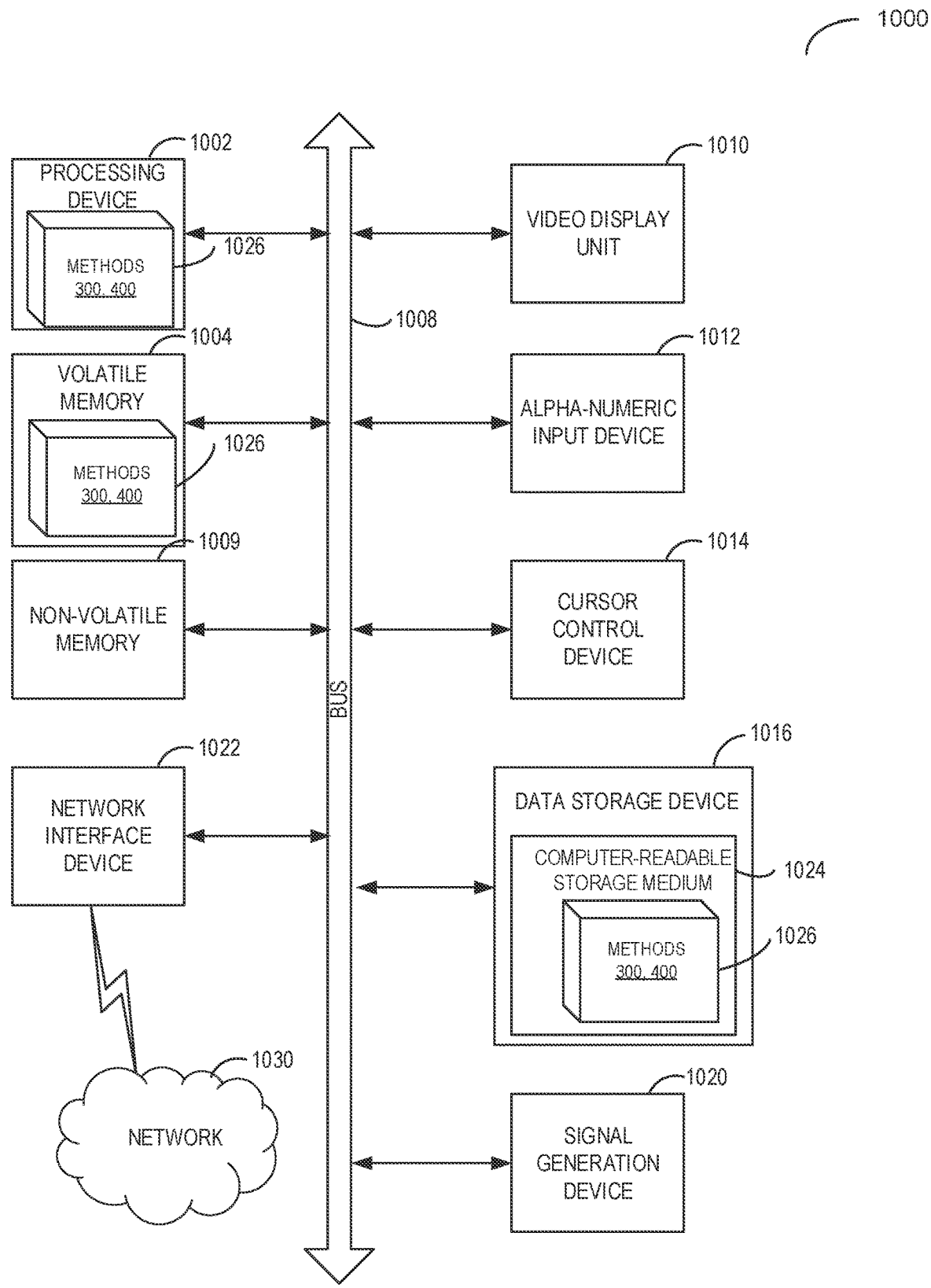
FIG. 6 depicts a high-level component diagram of another example computer system, which may be employed to implement the systems and methods described herein.

FIG. 6 depicts a high-level component diagram of an example computer system which may be employed to implement the systems and methods described herein. In various implementations, computer system 1000 may perform the functions of host computer system 100 of FIG. 1. In some implementations, computer system 1000 may be connected (e.g., via a network 1030, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1009 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing methods 300 and/or 400 of zero-copy forwarding for NFV.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, by a supervisor of a virtual execution environment running on a host computer system, a definition of a packet filter originated by the virtual execution environment running on the host computer system;
   responsive to validating the packet filter, associating the packet filter with a virtual network interface card (vNIC) of the virtual execution environment;
   receiving, by the supervisor, a first network packet originated by the vNIC;
   responsive to matching, by the packet filter, the first network packet to a network connection maintained by a proxy application, causing the packet filter to bypass the proxy application by forwarding the first network packet via the network connection, wherein the proxy application runs within one of: the virtual execution environment running on the host computer system, a privileged execution environment running on the host computer system, or a non-privileged execution environment running on the host computer system, or the proxy application runs on another host computer system;
   receiving, by the supervisor, a second network packet originated by the vNIC; and
   responsive to failing to match the second network packet to the packet filter, causing the proxy application to create a new network connection to a destination specified by the second network packet.

2. The method of claim 1, wherein forwarding the first network packet further comprises:
   substituting a source address of the first network packet with a source address of a network interface card (NIC) associated with the network connection.

3. The method of claim 1, wherein matching the first network packet to the network connection specified by the packet filter further comprises:
   matching a link layer parameter specified by the first network packet to a corresponding network link layer parameter associated with the network connection.

4. The method of claim 3, wherein the link layer parameter is at least one of: a protocol, a destination address, or a port.

5. The method of claim 1, wherein the packet filter is a Berkley Packet filter (BPF).

6. The method of claim 1, further comprising:
   responsive to receiving an incoming network packet via the network connection, forwarding the incoming network packet to the vNIC.

7. The method of claim 1, wherein validating the packet filter further comprises:
   ascertaining that two or more rules encoded by the definition of the packet filter are not mutually-exclusive.

8. The method of claim 1, wherein validating the packet filter further comprises:
   ascertaining that two or more rules encoded by the definition of the packet filter do not specify an infinite loop.

9. The method of claim 1, wherein validating the packet filter further comprises:
   ascertaining that two or more rules encoded by the definition of the packet filter do not specify an infinite recursion.

10. A computer system, comprising:
    a memory; and
    a processing device, coupled to the memory, to:
        receive, by a supervisor of a virtual execution environment running on the computer system, a definition of a packet filter originated by a virtual execution environment running on the computer system;
        responsive to validating the packet filter, associate the packet filter with the virtual network interface card (vNIC) of the virtual execution environment;
        receive, by the supervisor, a first network packet originated by the vNIC;
        responsive to matching, by the packet filter, the first network packet to a network connection maintained by a proxy application, cause the packet filter to bypass the proxy application by forwarding the first network packet via the network connection, wherein the proxy application runs within one of: the virtual execution environment running on the host computer system, a privileged execution environment running on the host computer system, or a non-privileged execution environment running on the host computer system, or the proxy application runs on another host computer system;
        receive, by the supervisor, a second network packet originated by the vNIC; and
        responsive to failing to match the second network packet to the packet filter, cause a proxy application to create a new network connection to a destination specified by the second network packet.

11. The computer system of claim 10, wherein forwarding the first network packet further comprises:
    substituting a source address of the first network packet with a source address of a network interface card (NIC) associated with the network connection.

12. The computer system of claim 10, wherein matching the first network packet to the network connection specified by the packet filter further comprises:
    matching a link layer parameter specified by the first network packet to a corresponding network link layer parameter associated with the network connection.

13. The computer system of claim 12, wherein the packet filter is a Berkley Packet filter (BPF).

14. A non-transitory computer-readable storage medium comprising executable instructions that, when executed by a host computer system, cause the host computer system to:
    receive, by a supervisor of a virtual execution environment running on the host computer system, a definition of a packet filter originated by a virtual execution environment running on the host computer system;
    responsive to validating the packet filter, associate the packet filter with the virtual network interface card (vNIC) of the virtual execution environment;
    receive, by the supervisor, a first network packet originated by the vNIC;
    responsive to matching, by the packet filter, the first network packet to a network connection maintained by a proxy application, cause the packet filter to bypass the proxy application by forwarding the first network packet via the network connection, wherein the proxy application runs within one of: the virtual execution environment running on the host computer system, a privileged execution environment running on the host computer system, or a non-privileged execution environment running on the host computer system, or the proxy application runs on another host computer system;

receive, by the supervisor, a second network packet originated by the vNIC; and responsive to failing to match the second network packet to the packet filter, cause a proxy application to create a new network connection to a destination specified by the second network packet.

15. The non-transitory computer-readable storage medium of claim 14, wherein forwarding the first network packet further comprises:

substituting a source address of the first network packet with a source address of a network interface card (NIC) associated with the network connection.

16. The non-transitory computer-readable storage medium of claim 14, wherein matching the first network packet to the network connection specified by the packet filter further comprises:

matching a link layer parameter specified by the first network packet to a corresponding network link layer parameter associated with the network connection.

17. The non-transitory computer-readable storage medium of claim 16, wherein the link layer parameter is at least one of: a protocol, a destination address, or a port.

18. The non-transitory computer-readable storage medium of claim 14, further comprising executable instructions that, when executed by the host computer system, cause the host computer system to:

responsive to receiving an incoming network packet via the network connection, forwarding the incoming network packet to the vNIC.

\* \* \* \* \*